Jan. 17, 1928.                                                         1,656,678
R. PAWLIKOWSKI
SOLID FUEL INTERNAL COMBUSTION ENGINE AND METHOD OF OPERATION THEREOF
Filed April 20, 1923           4 Sheets-Sheet 2

Witnesses:
Erich Arlt.
Alfred Paul.

Inventor:
Rudolf Pawlikowski

FIG. 8.

Patented Jan. 17, 1928.

1,656,678

UNITED STATES PATENT OFFICE.

RUDOLF PAWLIKOWSKI, OF GORLITZ, GERMANY.

SOLID-FUEL INTERNAL-COMBUSTION ENGINE AND METHOD OF OPERATION THEREOF.

Application filed April 20, 1923, Serial No. 633,496, and in Germany January 2, 1922.

Hitherto, considerable difficulty has been experienced in the operation of internal combustion engines of the solid fuel type in maintaining a constant supply of the powdered coal or other solid fuel to the combustion chamber of the engine, due to coking and massing of the fuel in the passages leading from the reservoir to the engine combustion chamber and hence such irregularities in the feed of the fuel have been experienced as to prevent the wholly successful and economical operations of engines of this type.

It is the object of the present invention to overcome this defect in solid fuel internal combustion engines by thoroughly mixing the coal dust or powder with air and providing means for maintaining the coal dust laden air in continuous agitation whereby the accumulation and massing or caking of the solid fuel at local points throughout the fuel system is eliminated.

A further object is the provision of a solid fuel internal combustion engine wherein the fuel and air mixture is introduced into the combustion chambers of the engine by the difference in pressure existing in the fuel feeding system and in the combustion chamber, the delivery of the fuel mixture being further enlarged by the provision of a mechanical feeding device such for instance as a screw conveyor.

A further object is the provision in the fuel system of means for preventing the accumulation and massing of the powdered solid fuel at the point of delivery to the combustion chamber of the engine and to constantly maintain the entire amount of fuel mixture in the system in circulation therein.

A further object is the provision in the fuel feeding system of a mechanically driven blower arranged to maintain the fuel mixture in circulation throughout the system, a fuel pulverizer and preheater.

A further object is the provision of means for igniting the coal dust at such moment as to insure its complete combustion in the combustion chamber of the motor in the relatively short period ordinarily available under such conditions whereby the highest possible efficiency of the fuel is obtained and furthermore the minimum quantity of fine light ash results from the combustion of the fuel which may be readily scavenged from the combustion chamber.

A further object is the provision of means for effecting the further scavenging of ash and other products of combustion from the combustion chamber.

In the accompanying drawing wherein an approved embodiment of the invention is illustrated:—

Referring to the drawing in detail, the invention is shown as applied to an internal combustion engine of the single cylinder type, although it will be understood, the same may be readily applied to engines of more than one cylinder. The cylinder 2 is provided with a head 25 in which is provided a receiving chamber or nozzle 3 having a plate 4 located thereover in which is formed a perforation establishing communication between the nozzle 3 and the combustion chamber of the cylinder 2.

The coal to be consumed as fuel is deposited in a hopper 7 mounted upon and connected with a grinding mill 8, the discharge end of the latter being connected with the inlet of a fan blower 9 whereby the powdered coal or coal dust is drawn from the mill 8 and carried upwardly through the conduit 10 by which it is conducted to a separator 11. From the separator 11 the large particles of the coal or other fuel which are not suitable for combustion in the combustion chamber of the engine are returned through the conduit 12 to the mill 8, whereas the remainder of the fuel thoroughly mixed with air from the blower 9 is conducted from the separator 11 through the conduit 14 to a receptacle 5 located adjacent the combustion chamber of the engine. The coarser and heavier particles of the powder separated in the separator 11 may also be discharged from the separator externally instead of into the mill 8. The dust passing to the machine will thus be cleaner and contain less ashes because the sorted heavier particles which usually contain mineral and ashes are not ground with fine particles. The conduit 14 is partially enveloped by a heater 13 by which the fuel and air mixture is heated preliminary to its admission to the combustion chamber of the engine.

A surplus quantity of fuel circulated in the system which is not required for the normal operation of the engine is returned from the conduit 15 through the receptacle 5 to the mill 8 whereby a closed circuit for the mixture of fuel and air is provided through the mill 8, blower 9, conduit 10, separator 11, conduit 14, receptacle 5 and conduit 15, and due to the continual operation of the blower 9, the fuel is constantly maintained in circulation through this circuit. The hopper 7 is preferably so constructed that a portion of the heat of the engine during operation may be utilized for heating it and the coal passing therethrough while the heating of the device 13 is effected by the products of combustion from the engine cylinder 2.

A pulley 16 carried by the crank shaft 6 of the engine is utilized to drive the shaft 18 of the mill 8 through a power transmitting belt 17 and the rotation of the shaft 18 is transmitted to the drive shaft 20 of the blower 9 through a belt 19.

The receptacle 5 is provided with an airtight cover 23 which latter, however, is preferably removable to facilitate access to the interior of the receptacle when occasion requires and the lower extremity of the receptacle is preferably hopper-shaped and is supported upon a casing 24 mounted upon the cylinder head 25. The casing 24 is provided with cylindrical chambers receiving screw conveyors 26 and 27, the chambers of the screw conveyors 26 and 27 communicating with the discharge end of the receptacle 5.

The two screw conveyors 26 and 27 have corresponding threads but are rotated in opposite directions so that the unconsumed surplus of the coal dust which is delivered to the inlet of the engine by the conveyor 26, is returned to the receptacle 5 by the conveyor 27.

Figure 2:
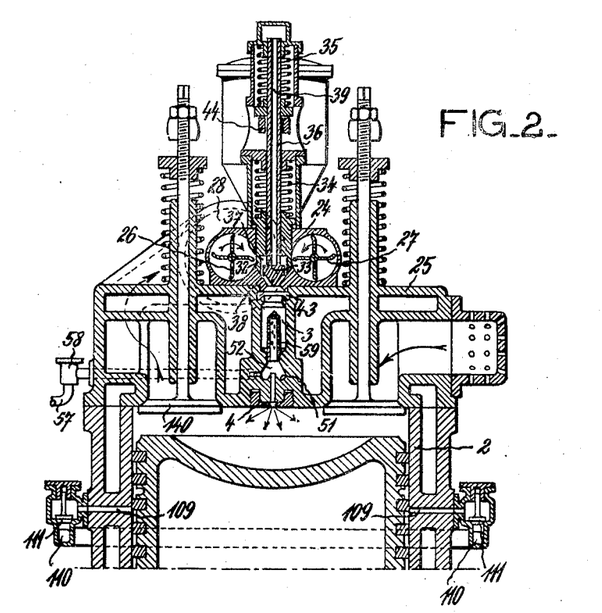
Fig. 2 is an enlarged fragmentary sectional view of the head of the engine taken at right angles to Figure 1.
Figures 7, 9, 11, 12, 13, 14:
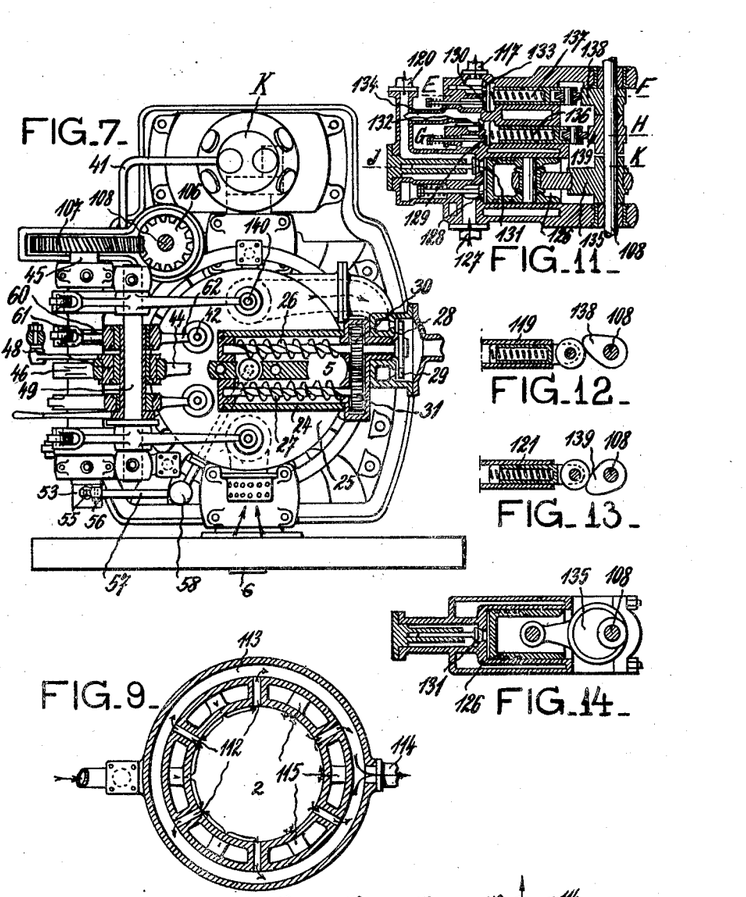
Fig. 7 is a horizontal section taken approximately on the line A—A of Fig. 1.
Fig. 9 is a transverse sectional view on the line C—D, Fig. 1.
Fig. 11 is a detail sectional view of the pumps and operating means therefor forming part of the scavenging mechanism of the engine.
Figs. 12, 13 and 14 are sectional views on the lines E—F, G—H and J—K, Fig. 11, respectively.

The screw conveyors 26 and 27 may be operated by an electric motor or, as suggested in Figure 7, by a turbine 28 located in the exhaust conduit from the engine and provided with a turbine wheel 29 carried on the extended end of the shaft of one of the conveyors, the rotary movement thus obtained being transmitted to the other conveyer by pinions 30 and 31. As indicated in Fig. 2 each conveyor is preferably formed with a plurality of threads or helical ribs whereby to cause the coal dust to be energetically mixed and beaten with the air. It is not intended to utilize the common type of slowly operating conveyor or agitating device as the air in this case would escape from the mixture and thus reduce its fluidity, but on the contrary the conveyor should operate at a comparatively high velocity so that the coal particles forced aside by the blades cannot flow back behind them by reason of their inertia so as to rapidly produce a slight degree of vacuum behind the blades into which air flows which can be mixed with the coal dust by the gas blades.

The nozzle or receiving chamber 3 is separated from the conveyor chambers by a double valve, the respective parts of which are opened and closed successively whereby the space lying intermediate the two valves may be utilized for carrying off the gases of premature explosions in the combustion chamber of the engine and the residue of compressed air.

The two valves are indicated at 32 and 33 and are normally maintained in closed position by springs 34 and 35. The outer valve 32 is in the form of a jacket or annulus and surrounds the inner valve 33. The outer hollow valve 32 is guided partly by the conveyor casing 24 and partly by the stem 36 of the inner valve 33. The outer valve 32 is arranged to cover and uncover the openings in adjacent walls of the chambers of the conveyor casing 24 while the inner valve 33 controls communication between said chambers and the nozzle 3. The annular chamber 37 between the two valves communicates, when said valves are in closed position, by transverse and longitudinal openings 38 and 39, respectively formed in the stem 36 either with the atmosphere or with a conduit 40, Fig. 1. Thus when the two valves 32 and 33 are closed the chamber 37 is substantially at atmosphere pressure.

The upper extremity of the nozzle or feeding chamber 3 is tapered to provide a seat for the valves 32 and 33 and also to insure constant and unrestricted flow of fuel through the chamber when the valves are in open position. The flow of fuel into the nozzle is further insured by a conical projection 40′ carried by the inner valve 33 as clearly shown in Figs. 3 to 6. The portion of the valve 33 which actually engages its seat is in the form of a relatively sharp corner or edge which, while insuring against leakage past the valve, minimizes the possibility of accumulation and packing of the solid matter contained in the fuel on the valve seat and valve.

Compressed air is conducted from the control valve 42 through a passage 41 into an annular groove 43 provided in the wall of the chamber 3 and the flow of air is utilized to clean the valve 33 and seat of particles of solid fuel which might accumulate thereon.

Figure 5:
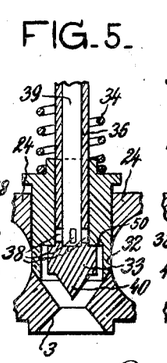

Operation of both valves 32 and 33 is effected by a rocker arm 44 which latter is actuated by a cam 46 on the valve actuating shaft 45. The shaft 45 is driven in any suitable manner as for instance, by pairs of gear wheels 104—105—106 and 107 and by a vertical intermediate shaft 108. The stem 36 of the valve 33 is actuated directly by engagement of a collar thereon with the adjacent extremity of the rocker arm 44, while the movement of the outer or jacket valve 32 is effected by engagement of a shoulder on the valve 33 with an internal shoulder 50 of the valve 32 whereby the last mentioned valve is caused to open later than the valve 33, whereas during the closing movement of the two valves the outer valve 32 closes in advance of the inner valve 33 before the openings 38, as shown in Fig. 5, are uncovered.

Figures 3, 4:
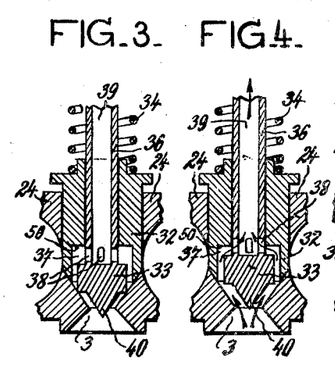
Figs. 3, 4, 5 and 6 are enlarged detail views showing the various positions of the valve controlled inlet of the engine.
Figure 6:
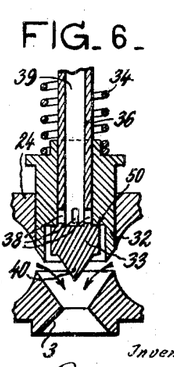

Fig. 3 shows both valves in a closed position; Fig. 4 shows the valve 33 partially opened and the valve 32 closed, the compressed air being forced through the chamber 3, openings 38 and bore 39 of the stem of the valve 33. Fig. 5 shows the position of the valves 32 and 33 at the moment the external shoulder of the valve 33 is engaged with the shoulder 50 of the valve 32 and the latter is caused to move upwardly to open position. Fig. 6 shows both valves in open position permitting the flow of the fuel mixture into the chamber 3 as indicated by the arrows.

The lift of the valves 32 and 33 is adjusted by a centrifugal governor 47 acting through links and levers on an eccentric 48 upon which the rocker arm 44 is pivotally mounted, the eccentric 48 being rotatably mounted on a supporting shaft 49.

The lower extremity of the receiving chamber 3 is enlarged as at 52 and provided with an annular channel 51 for receiving the igniting medium for the fuel mixture conducted to said channel through a passage 57. The igniting medium is supplied by a pump 53, the piston 54 of which is connected with the shaft 45 by a connecting rod 55, the crank pin of the shaft 45 being indicated at 56. A check valve 58 is preferably located in the conduit 57 at a point intermediate the pump 53 and the cylinder 2.

During an initial opening movement of the inner valve 33 the openings 38 of the stem thereof are partially uncovered and the compressed air entering the receiving chamber 3 is thus allowed to escape through the uncovered openings 38 into the bore 39 of the stem. The openings 38 are thereafter completely closed and the valve 32 taking on the movement of the valve 33 permits the necessary quantity of the fuel mixture to freely pass into the nozzle 3. The solid fuel arriving in the receiving chamber 3 in a loose aerated condition is deposited on the screen member 59 through which it is blown into the combustion chamber of the cylinder 2 by the air admitted incident to the opening of the air valve 42.

The operation of the air valve 42 is effected by a rocker arm 61—62 actuated by a cam 60 on the shaft 45, the valve 42 being opened against the tension of a spring (not shown).

Compressed air is supplied to the valve 42 by a conduit 41 connected with an air compressor K driven by the crank shaft 6 of the engine.

Upon closure of the valve 32 the supply of fuel mixture from the conveyor chambers of the casing 24 to the receiving chamber 3 is cut off and the possibility of igniting the fuel contained in said chambers due to backfiring of the engine through to chamber 3 is thus eliminated. Subsequent to the closure of both valves 32 and 33, the compressed air admitted through the passage 41 sweeps over and cleans the valve 33.

The igniting medium is preferably introduced in the channel 51 prior to the delivery of the compressed air from the passage 41 so that as the fuel mixture is blown into the combustion chamber of the engine incident to opening of the air valve 42, it picks up the igniting medium and the entire contents of the receiving chamber 3 is injected through the apertured plate 4 into the combustion chamber, the ignition of the entire volume of fuel mixture being thus insured.

The valve 33 may be so arranged as to open inwardly toward the combustion chamber of the engine whereby it is retained closed by the internal pressure in the combustion chamber and when such arrangement is resorted to, a spring 35 of less tension may be used than is required when the valve 33 opens outwardly in the manner illustrated in the accompanying drawing.

The engine may be simplified by dispensing with the air compressor K and conduits 41 and valve 42 and increasing the size of the chamber 3 and channel 51 so that during the compression stroke, a part of the compressed air passes from the working cylinder 2 into the receiving chamber 3 and is there mixed with the heated gases of the preceding explosion. According to this arrangement, the pressure in the receiving chamber 3 and channel 51 is higher than that in the combustion chamber and thus the ignited charge of fuel mixture is caused to enter the combustion chamber of the engine.

Figure 8:
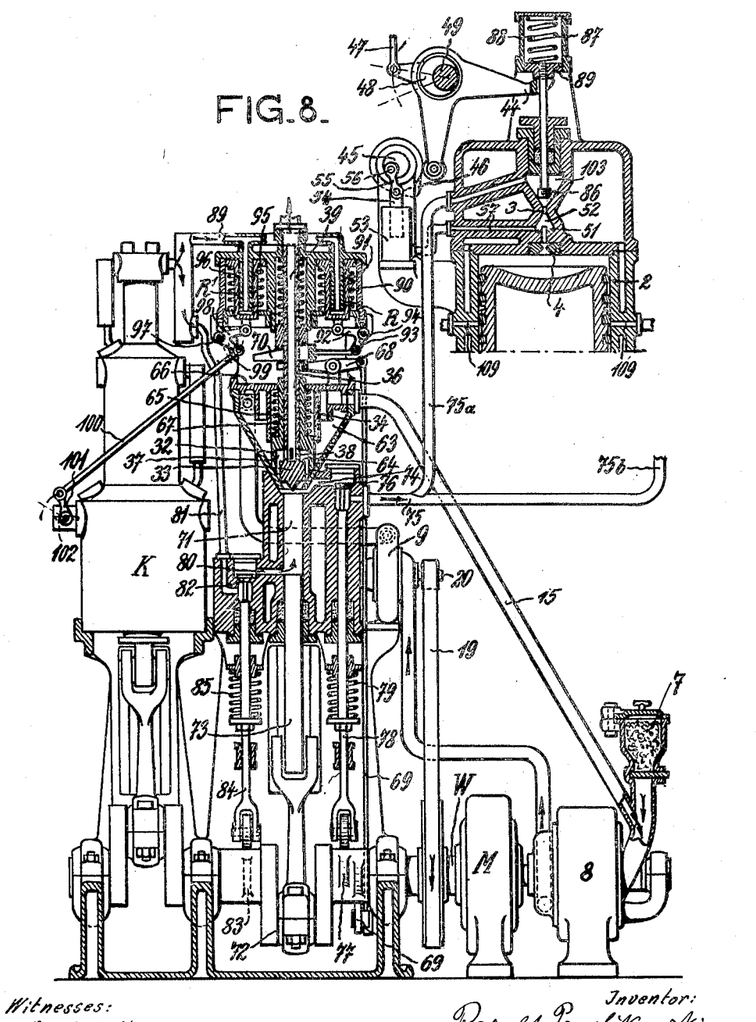
Fig. 8 is a vertical sectional view of a modified form of the engine wherein the fuel feeding and mixing system is located apart from the combustion chamber of the engine.

In the modification of the invention illustrated in Fig. 8, the fuel producing and feeding system includes the mill 8 for reducing the coal to a powder which may be driven by an electric motor M, which latter also operates the compressor K for producing the compressed air. The blower 9 is provided for drawing the coal dust from the mill 8 and the shaft 20 of the blower is driven from the shaft W of the electric motor M by a belt 19. The blower 9 carries the fuel mixture into a storage receptacle 63 which is preferably in the form of a hopper and is provided with an open lower end controlled by a double valve 32—33 constructed in the same manner as the valves identified by the corresponding reference numerals in Figures 1 to 7. The surplus of the fuel mixture is carried from the storage receptacle 63 to the mill 8 by a pipe or conduit 15 whereby a closed circuit through which the fuel may be conducted, is provided.

The hollow stem 67 of the outer valve 32 is telescopically engaged with the hollow stem 36 of the inner valve 33 and works within the depending flange 65 carried by the cover 66 of the storage receptacle 63, a spring 34 being interposed between the valve 32 and the cover 66 for normally maintaining said valve in closed position.

The actuating lever 68 for the valve 33 is actuated from the motor shaft W through a cam gear and pull rod indicated at 69. In order to control the stroke or lift of the valves an adjustable wedge 70 is interposed between the collar of the valve stem 36 and the adjacent extremity of the valve lever 68, the adjustment of said wedge 70 being automatically effected by a pressure reducing regulator indicated generally at R.

The lower extremity of the storage receptacle 63 for the fuel mixture communicates with and is mounted on the upper extremity of a cylinder 71 in which is mounted a reciprocal piston 73 connected with a crank 72 of the motor shaft W. The timing of the valves 32 and 33 with respect to the movement of the piston 73 is such that, as said valves are closed, the piston moves upwardly in the cylinder, whereas when the valves are opened the piston moves downwardly therein so as to produce the necessary reduction of pressure in the bore of the cylinder 71 to insure drawing of the fuel mixture therein. A valve 76 controls the passage of the fuel mixture from the conduit 74 in the cylinder 71 to the conduit 75. The control of the valve 76 is effected by a cam 77 of the motor shaft W operating a push rod 78 which latter is moved upwardly in opposition to the tension of the spring 79. The valve 76 is also preferably provided with a sharp seat engaging edge to prevent the accumulation and adherence of the solid matter in the fuel mixture on the valve seat. The admission of compressed air to the bore of the cylinder 71 is controlled by the piston 73, which latter is adapted to uncover the extremity 80 of the conduit 81 for compressed air when said piston is in its lowermost position as shown in Fig. 8. The passage of compressed air from the conduit 81 is controlled by a valve 82 operated by a cam 83 coacting with a push rod 84 moved upward in opposition to a spring 85.

In Fig. 8 the fuel feeding and producing mechanism is shown as connected with only one internal combustion engine cylinder 2 by a branch pipe 75ª of the supply pipe 75, but it may be readily understood that the same may be utilized for supplying any number of cylinders in which case additional branch pipes, such, for instance as 75ᵇ, are provided.

In constructing the engine cylinder 2 for use in connection with a fuel producing and supplying apparatus as shown in Fig. 8, each cylinder is provided with an inlet valve 86 which is normally retained in closed position by a spring 87 working in a cylinder 88 against a head 89 carried by the stem of the valve. The rocker arm 44 coacts with the head plate 89 of the stem of the valve 86 and said rocker arm is adjustably mounted on a shaft 49 and actuated by a cam on the shaft 45 in the same manner as the engine illustrated in Figs. 1 to 7. The cylinder 2 is also supplied with the igniting medium supplied by the pump 53 and delivered thereto through the conduit 57 to the channel 51.

During the opening movement of the valve 33 the openings 38 in the stem thereof are covered and subsequently the valve 32 is carried to its open position along with the valve 33. The piston 73 moves downwardly effecting its suction stroke during the period both valves 32 and 33 are open but before the piston uncovers the extremity 80 of the conduit 81 the valves 32 and 33 are again closed, the valve 32 closing first and thereafter the valve 33.

According to the arrangement in Figure 8 the fuel producing and feeding system operates entirely independent of the engine and only serves to furnish the fuel necessary for the operation thereof. During the upward stroke of the piston 73 the entire contents of the cylinder 71 are ejected therefrom and at the same time the inlet 80 for compressed air is covered.

Due to the independence of operation of the engine and fuel supplying mechanism it is quite evident that in order to compensate for varying running conditions of the engine it is necessary to regulate the quantity of fuel supplied by the mechanism. According to the invention the desired regulation of operation of the fuel supply mechanism is automatically effected in response to pressure variations in the fuel supply conduit 75. The regulating device is connected by a branch conduit 89 with the air supply conduit 81 and includes two regulators R and R¹. The regulator R includes a piston 91 subjected on the one side to the pressure existing in the branch conduit 89 and on the other side to the tension of a spring 90. The piston 91 is connected with one arm of a bell crank 94 the opposite arm of which is connected with a wedge member 70, the respective arms of the bell crank being indicated at 92 and 93.

The other regulator R¹ also includes a piston 96 which is subjected to the opposing forces of the fluid pressure existing in the conduit 89 and a spring 95. The piston 96 is connected with one arm 98 of a bell crank, the other arm of which, 99, is connected through a rod 100 with an arm 101 of a throttle valve 102.

When, due to any cause whatever, less than the normal quantity of fuel is required for the operation of the engine, the pressure in the conduit 75 increases and likewise the pressure in the air supply conduit 91 increases due to the excessive back pressure in the cylinder 71. Under these conditions the pistons 91 and 96 are forced downwardly against the tension of the springs 90 and 95 thus rocking the bell cranks 92, 93, 98, and 99. The movement of the bell cranks effects, in one instance, the withdrawal of the wedge member 70 and the closure of the throttle valve 102. The displacement of the wedge member 70 is proportioned in extent to the increase in pressure in the air conduits, and the wedge member 70 thus controls the stroke of the valves 32 and 33 according to the varying requirements of the engine, while by the complete or partial closure of the valve 102, the admission of air to the compressor K is correspondingly diminished.

If desired, the valve chamber 103 in the engine cylinder 2 may be connected by a return pipe (not shown) to the fuel grinding mill 8. Such a pipe is only necessary, however, in instances where the automatic regulation of the valves 32 and 33 in response to pressure variations is dispensed with. It is essential to operate the machine with a surplus of fuel over that required for the total consumption of the engine.

Also, instead of regulating the stroke of the valves 32 and 33, the stroke of the piston 73 may be varied according to the varying fuel requirements of the engine.

Further, the piston 73 may be dispensed with and in this case much more compressed air is required for the injection of the fuel because at the conclusion of the emptying of the cylinder 71 of fuel said cylinder contains a quantity of air which must be discharged through the ports 38 and 39 when the valve 33 is opened before the cylinder can be effectively recharged with fuel.

Again referring to Figure 1, the cylinder 2 is provided with three circular series of ports, the uppermost series 109 of which is so arranged relative to the head of the cylinder that when the piston is in its uppermost position several of the rings thereof lie above the ports 109. All of the ports 109 communicate with an annular channel 110, check valves 111 being interposed between the ports and the channel. The intermediate series of ports 112 is so located as to be uncovered when the engine piston is in its lowermost position as indicated in full lines in Fig. 1. The ports 112 permit the products of combustion in the cylinder 2 to escape by way of the annular channel 113 and conduit 114 to the hollow walls of the hopper 7 which latter they heat and effect a preliminary heating of the fuel.

Figure 1:
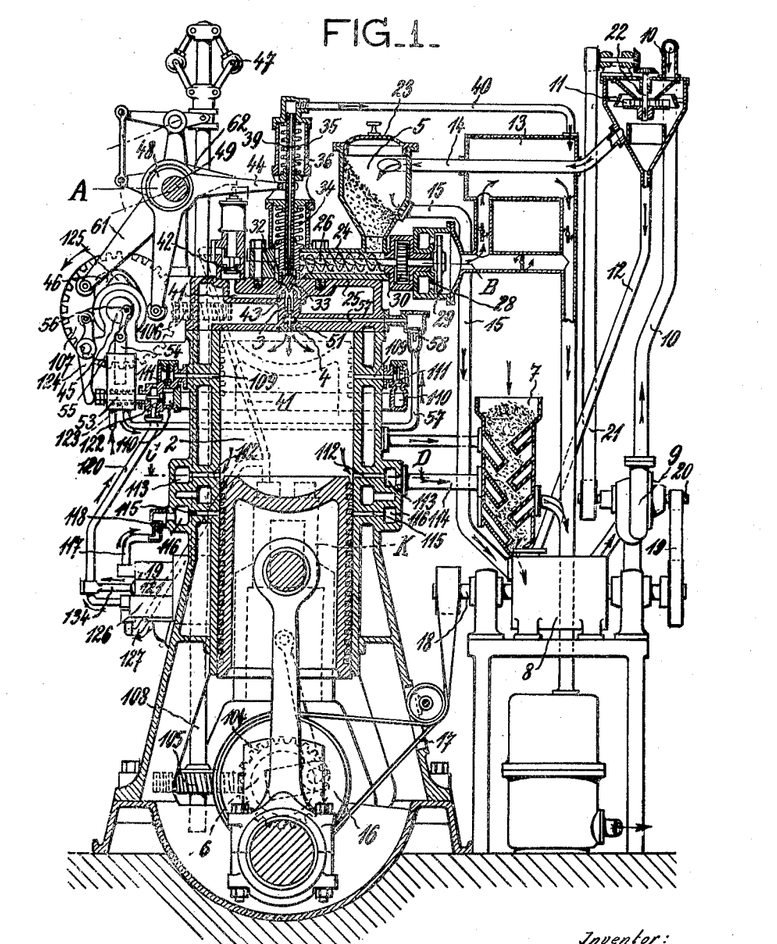
Figure 1 is a vertical section of the improved engine.

The lowermost series of ports 115 remains covered by the piston at all times and they communicate with an annular channel 116 connected by a conduit 117 with the pressure side of a scavenging pump 119, a check valve 118 being interposed in the conduit 117. The uppermost annular channel 110 is connected by a conduit 120 with the pressure side of a second scavenging pump 121. A regulating valve 122 being interposed. The last mentioned valve is opened against the tension of a spring 123 by a lever 124 actuated by a cam 125 on the shaft 45.

In addition to the two scavenging pumps 119 and 121, an air pump 126 is also provided for the scavenging ports 109, said air pump preferably having its air intake port connected by a conduit 127 with the main air conduit 41 of the engine, whereby to compress the air admitted to the ports 109 to a greater degree than the pressure existing in the supply conduit 41.

Figure 10:
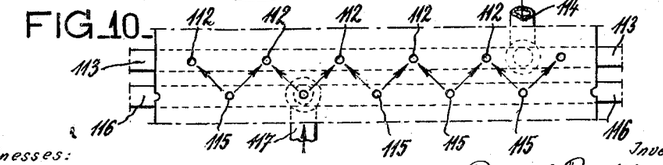
Fig. 10 is a fragmentary extended elevation of a portion of the interior of the cylinder of the engine.

Referring to the details of the several pumps illustrated in Figs. 11 to 14, the several pumps are provided with intake valves 128, 129, and 130 and with outlet valves 131, 132, and 133. The pistons of the several pumps are actuated by eccentrics mounted on a shaft 108, the piston 126 being actuated by an eccentric 135 and the pumps 19 and 21 operated by the cams 138 and 139 respectively. As suggested in Figure 10, the ports of the two series 112 and 115 are preferably arranged in staggered relation to one another.

When the piston of the engine reaches its lowermost position as shown in Fig. 1, the heated products of combustion will escape through the uncovered intermediate series of ports 112 and pass through the conduit 114 into the heating chambers of the hopper 7, all solid products of combustion being thus carried away. Compressed air or other fluid entering through the ports 115 finds its way between the wall of the cylinder and the several uppermost piston rings thereby effectively removing from the latter any accumulation of the products of combustion which might adhere thereto, such particles being carried along with the air and discharged through the exhaust ports 112. During the succeeding ascending stroke of the piston, the uppermost rings thereof remove from the wall of the cylinder such products of combustion as may accumulate thereon and as soon as the piston reaches the level of the port 109, the valve 122 is opened by the cam 125 acting on the lever 124 and the blasts of air discharged from the ports 109 discharge all remaining solid and gaseous products of combustion through the main exhaust valve 140 of the engine.

The valve 22 is again opened as the engine piston, during its compression stroke reaches the level of the ports 109, so that the scavenging air under higher pressure than that existing in the engine combustion chamber may enter between the piston and the wall of the cylinder thus preventing solid particles of fuel from entering and settling between the piston and the cylinder wall. During the working stroke of the piston the valve 122 is closed.

The pump 121 is connected through a channel 134 with the conduit 120 for admitting a small quantity of lubricating oil to the latter which is distributed over the piston and rings by the air entering through the ports 109 prior to the admission of fuel so as to prevent the ash and other products of combustion from entering the groove in the piston for the rings.

It will be understood that the engine cylinder 2 in the arrangement shown in Figure 8 may also be provided with the series of ports 109, 112 and 115 and the scavenging devices associated therewith as illustrated in detail in Figs. 1 and 9 to 14.

It will be understood that in my invention as illustrated herein, I introduce a certain amount of air into the engine cylinder directly and I also introduce into said cylinder by way of a receiving chamber, a mixture of air and pulverized solid fuel. The invention also includes means whereby the proportion of these two media (that is, the air introduced into the cylinder directly and the fuel and air mixture introduced via the receiving chamber) may be varied and in the particular embodiments shown this variation is obtained by altering the amount of fuel and air mixture admitted, and particularly by governing the action of the valve which admits such mixture of fuel and air.

Another feature of importance resides in admitting the fuel and air mixture to the receiving chamber at a time when there is a low pressure or vacuum in the working chamber of the cylinder, and providing a retarder between the receiving chamber and the combustion chamber or working chamber. The object of this retarder is to hold back temporarily in the receiving chamber a portion of the fuel contained in the fuel and air mixture while permitting the remainder of said mixture to flow into the combustion chamber during the suction stroke. Thus during such suction stroke the medium admitted to the combustion chamber will consist chiefly of air and in any event the proportion of fuel contained therein will not be sufficient to cause spontaneous ignition of the mixture during its subsequent compression in the combustion chamber. At about the end of the compression stroke an increased pressure is applied to the portion of the mixture held back by the retarder and thus said portion of the mixture is ejected into the combustion chamber. The retarder interposed between the receiving chamber and the combustion chamber may consist in a suitable formation of the walls of the passage which connects the receiving chamber with the combustion chamber, and said retarder may also consist of a screen such as shown at 59 in Fig. 2, or both of these instrumentalities may be applied jointly as shown in Fig. 2.

The present engine operates the same as Diesel type engines, the ignition being effected by high compression of the fuel, thus dispensing with special ignition devices. The working cylinder of the engine is filled with air the same as in a Diesel type engine, the air is compressed and then the fuel, either powdered coal alone or mixed with oil, is introduced into the working cylinder near the end of the compression stroke of the piston. Due to the high compression of the air the temperature in the working cylinder becomes so high as to cause ignition of the fuel. Most kinds of coal, particularly lignite, also bituminous coal, which contain much gas ignite immediately on entering the cylinder when coming in contact with the pre-compressed hot, fresh air. However, there are other kinds of coal, particularly coals which contain a high percentage of ash, which burn too slowly for proper operation of the engine and in using these grades of coal ignition may be accelerated by injecting prior to the introduction of coal, or together with the same, a small quantity of oil into the working cylinder. As well known, the ignition oil is ignited immediately upon coming in contact with the heated air in the engine to cause complete and rapid combustion of the coal fuel. The portion of the ignition oil is, of course, varied, according to the quality of the coal and its burning efficiency.

In practice it has been found that it is not essential that the screw conveyors 26 and 27 be operated continuously without impairing the efficient operation of the engine.

Although it has been generally stated throughout the foregoing specification that coal dust is employed as the fuel for operating the engine herein described, it will be understood that the invention is not necessarily restricted to those particular substances for use as a fuel, but in other such substances that may be reduced to the form of a powder may be used with equal effectiveness such, for instance, as anthracite, coal, lignite, charcoal, peat, coke and the like.

I claim—

1. In an internal combustion engine having a combustion chamber, the combination of a container, means for producing a loose mixture of air and pulverized solid fuel and for maintaining a surplus supply of said mixture in the container, means for feeding the fuel mixture into the combustion chamber from the container in accordance with the requirements of the working condition of the engine.

2. In an internal combustion engine, the combination of means for producing and containing a surplus supply of a loose mixture of air and pulverized solid fuel, means for maintaining said mixture in motion, means for taking out measured charges of fuel from the moving mixture in accordance with the requirements of the operating conditions of the engine, and means for delivering the charges into the combustion chamber.

3. In an internal combustion engine including a combustion chamber, the combination of means for producing and containing a surplus supply of a loose mixture of air and pulverized solid fuel, means for maintaining said loose mixture in motion, a fuel inlet for the combustion chamber interposed in the path of movement of the fuel mixture, means for taking out measured charges of fuel from the moving mixture according to the operating conditions of the engine, and means for delivering the charges into the combustion chamber.

4. In an internal combustion engine including a combustion chamber, means for containing a surplus supply of a loose mixture of air and pulverized solid fuel, means for taking out measured charges of fuel from the moving mixture in accordance with the working requirements of the engine, and means for moving and working the portion of the mixture lying adjacent the last mentioned means and means actuated by fluid pressure to effect operation of the means for moving and working the fuel mixture.

5. In an internal combustion engine including a combustion chamber, the combination of means for producing and containing a surplus supply of a mixture of air and pulverized solid fuel, charge forming means associated with the first mentioned means for supplying charges of the fuel mixture in accordance with the working condition of the engine, means for varying the fuel mixture admitted to the charge forming means, and means for delivering the charges to the combustion chamber.

6. In an internal combustion engine including a combustion chamber, means for drying solid fuel, means for disintegrating solid fuel, a conduit constituting a closed circuit for fuel communicating with the fuel disintegrating means, grading means for solid fuel interposed in said conduit, means for returning coarse particles of solid fuel from the grading means to the disintegrating means, means for introducing air into said conduit and for maintaining a mixture of air and pulverized solid fuel in circulation therein, the combustion chamber having an inlet adapted to receive fuel mixture passing through the conduit, and means for admitting charges of the fuel mixture from said conduit to the combustion chamber.

7. In an internal combustion engine including a combustion chamber having a fuel inlet, means for pulverizing and aerating solid fuel, means for maintaining the aerated solid fuel in motion past the fuel inlet of the combustion chamber, and means for admitting charges of the pulverized and aerated solid fuel into the combustion chamber.

8. In an internal combustion engine including a combustion chamber having a fuel inlet, means for pulverizing and aerating solid fuel whereby to produce a fuel mixture, means for containing a surplus supply of said fuel mixture, means for withdrawing fuel from the containing means, moving it past the fuel inlet of the combustion chamber and returning it to the containing means, and means for withdrawing charges of fuel from the fuel mixture passing the fuel inlet of the combustion chamber for delivery to the latter.

9. An internal combustion engine as claimed in claim 8 characterized in that the means for withdrawing the fuel mixture from the containing means and for moving it past the fuel inlet and returning it to the containing means is constituted by oppositely moving conveyors.

10. In an internal combustion engine including a combustion chamber and a fuel inlet therefor, means for producing a surplus supply of a mixture of air and pulverized solid fuel, means for maintaining said mixture in motion, a chamber adapted to receive charges of the fuel mixture and adapted to feed the charges into the combustion chamber through the fuel inlet whereby to protect the surplus supply against ignition by the fuel undergoing combustion in the combustion chamber.

11. In an internal combustion engine including a combustion chamber having a fuel inlet, means for producing a surplus supply of a mixture of air and pulverized solid fuel, means for maintaining said mixture in motion, a charge receiving chamber communicating with the fuel inlet of the combustion chamber, means for delivering the charge from the receiving chamber to the combustion chamber, and means for relieving the pressure existing in the receiving chamber subsequent to the delivery of a charge therefrom.

12. In an internal combustion engine including a combustion chamber, means for producing a surplus supply of a mixture of air and pulverized solid fuel, a charge receiving chamber, means for delivering charges of fuel mixture from the producing means to the receiving chamber in accordance with the requirements of the working condition of the engine, and a means connecting the combustion chamber with the receiving chamber adapted to permit passage of the heated gases and air from the combustion chamber to the receiving chamber during the compression stroke of the engine whereby the fuel is ignited in said receiving chamber and the high pressure results in the delivery of the remainder of the fuel mixture in the combustion chamber.

13. In an internal combustion engine including a combustion chamber, means for producing and containing a surplus supply of air and pulverized solid fuel, means for maintaining the fuel mixture in motion, a charge receiving chamber communicating with the combustion chamber, and means for controlling the admission of the fuel mixture from the containing means to the receiving chamber, said admission controlling means including independently operable controlling members, said controlling members being spaced apart, and means permitting the scavenging of the space between said members.

14. In an internal combustion engine including a combustion chamber, means for producing a surplus supply of a loose aerated combustible mixture, means for maintaining said mixture in motion, means for conducting the mixture into the combustion chamber, independently movable valve members controlling the admission of mixture to the combustion chamber, means for operating said valve members, and means associated with said operating means to vary the stroke thereof according to the variations in the working condition of the engine.

15. An internal combustion engine as claimed in claim 14 characterized with the provision of means associated with the operating means for varying the time of operation of the valve members.

16. In an internal combustion engine, a combustion chamber, a receiving chamber connected with the combustion chamber, means for producing a surplus supply of a loose mixture of air and pulverized solid fuel, means for maintaining the aerated mixture in continuous motion, means for feeding a measured quantity of the fuel into the receiving chamber, means for admitting a charge of ignitive medium to the receiving chamber, and means adapted to atomize the contents of the receiving chamber during its injection into the combustion chamber.

17. In combination, means for producing a surplus supply of a loose mixture of air and solid fuel, means for maintaining the loose mixture in continuous motion, a receiving chamber for the loose mixture, a combustion chamber communicating with the receiving chamber, means for supplying an ignitive medium, and means for successively admitting the fuel mixture and the ignition medium into the combustion chamber, said last mentioned means operating to initially ignite the ignitive medium and to project the fuel mixture into the combustion chamber through the flame thus produced.

18. In an internal combustion engine, means for producing a surplus supply of a loose mixture of air and a solid fuel means for producing a continuous motion in the aerated mixture, a distributing conduit, means for feeding the fuel mixture into the distributing conduit, means associated with the distributing conduit for supplying a plurality of points of use for the fuel mixture, and means for varying the supply of the fuel mixture according to the requirements of the engine.

19. In an internal combustion engine, means for producing a surplus supply of a loose mixture of air and pulverized solid fuel, a plurality of consuming devices for the fuel mixture operating independently of one another, a main conduit and branches connected therewith for supplying the fuel mixture consuming devices, a fuel pump associated with the main conduit for feeding the fuel mixture thereto, and means for varying the rate of delivery of the fuel by the pumping means according to the varying requirements of the consuming devices.

20. In an internal combustion engine, means for producing a surplus supply of a loose mixture of air and pulverized solid fuel, a plurality of combustion chambers, a main conduit for receiving the fuel mixture and for conducting it to the several combustion chambers, means for controlling the admission of the fuel mixture from the conduit to each combustion chamber, a feed pump associated with the main conduit, means for admitting charges of the fuel mixture from the producing means to the feed pump, an air pump connected with the feed pump for delivering the charge of fuel mixture therein into the main conduit, and means for controlling the delivery of air from the air pump according to the varying consumption of fuel mixture by the several combustion chambers.

21. In an internal combustion engine, means for producing a surplus supply of the loose mixture of air and solid fuel, a plurality of consuming devices for the fuel mixture, means for conducting the fuel mixture from the producing means to the consuming devices, an adjustable valve device for controlling the admission of the fuel mixture to the conducting means, means responsive to variations in the pressure existing in the conducting means for varying the operation of the means controlling the admission of the fuel mixture to the conducting means, the last mentioned means including an air pump adapted to deliver the fuel mixture through the conducting means.

22. An internal combustion engine as claimed in claim 21 characterized by the provision of means responsive to the pressure variations controlling the direction of the air compressor.

23. In an internal combustion engine, means for producing a surplus supply of a loose mixture of air and pulverized solid fuel, a combustion chamber, means for conducting the fuel mixture to the combustion chamber, a compressor for feeding the fuel mixture through the conducting means, the mixture producing means including a grinding mill for the solid fuel, means for dessicating the solid fuel, and means for heating the fuel mixture.

24. In an internal combustion engine, means for producing a surplus supply of loose air and pulverized solid fuel, a combustion chamber, a piston adapted to work with said combustion chamber, means for conducting the fuel mixture to the combustion chamber, means for injecting a scavenging medium between the walls of the combustion chamber and the piston for scavenging the products of combustion therefrom.

25. An internal combustion engine as claimed in claim 24 characterized in that the scavenging means includes a pump for compressing the scavenging medium and for delivering it to the combustion chamber under high pressure.

26. In an internal combustion engine, a cylinder having a combustion chamber, a piston mounted in said cylinder, means for supplying a loose mixture of air and pulverized solid fuel to the combustion chamber, means for admitting a scavenging medium to the cylinder at a point between the cylinder and the wall of the piston for scavenging the products of combustion therefrom, and means for admitting a lubricating medium to the scavenging medium for admission to the cylinder.

27. In an internal combustion engine, a cylinder having a combustion chamber, a piston mounted in said cylinder, means for supplying a loose mixture of air and pulverized solid fuel to the combustion chamber, said cylinder having an opening in the wall thereof, means for supplying a scavenging medium under pressure to said opening while the piston is moving thereover between the cylinder and the wall of the piston.

28. In an internal combustion engine, a cylinder having a combustion chamber, a piston mounted in said cylinder, means for supplying a loose mixture of air and pulverized solid fuel to the combustion chamber, said cylinder having an opening therein at one point in the length thereof and adapted to receive a fluid scavenging medium, said cylinder having an additional opening therein constituting outlet for the fluid scavenging medium, and means for supplying a fluid scavenging medium under pressure to the first mentioned opening while the piston is moving thereover.

29. In an internal combustion engine adapted for operation on pulverized solid fuel, a fuel receiving chamber having portions of the walls thereof inclined, a valve for controlling the admission of fuel to the receiving chamber, and a conical extension on the valve adapted to partially enter the receiving chamber.

30. In an internal combustion engine, a combustion chamber, a receiving chamber for fuel communicating with the combustion chamber, said receiving chamber being adapted to receive a charge of areated pulverized solid fuel, a two-part valve controlling the admission of fuel to the receiving chamber, the parts of the valve being movable relative to one another, and means for ejecting the fuel mixture contained in the receiving chamber into the combustion chamber, the last mentioned means operating to drive off through the space between the parts of the valve, solid accumulations of fuel and products of combustion from the receiving chamber.

31. An internal combustion engine as claimed in claim 30 characterized by the provision of means interposed between the receiving chamber and the combustion chamber for preventing passage into the latter of large pieces of solid fuel.

32. In an internal combustion engine, the combination, with the cylinder having a combustion chamber and a receiving chamber opening into said combustion chamber, of a conduit opening into said receiving chamber, means to conduct pulverized solid fuel and air through said conduit and into said receiving chamber, means extending the whole length of said conduit for stirring the air and fuel moving through said conduit, and means to deliver the mixture of fuel and air from said receiving chamber into the combustion chamber.

33. In an internal combustion engine, the combination, with the cylinder having a combustion chamber and a receiving chamber opening into said combustion chamber, of a conduit opening into said receiving chamber, means to conduct pulverized solid fuel and air through said conduit and into said receiving chamber, mechanically operated means extending the whole length of said conduit for stirring the air and fuel moving through said conduit, and means to deliver the mixture of fuel and air from said receiving chamber into the combustion chamber.

34. In an internal combustion engine, the combination, with the cylinder having a combustion chamber and a receiving chamber opening into said combustion chamber, of a conduit opening into said receiving chamber, means to conduct pulverized solid fuel and air through said conduit and into said receiving chamber, means extending the whole length of said conduit for stirring the air and fuel moving through said conduit, means to close said receiving chamber as against said conduit, and means operative after closing said conduit for delivering the mixture of fuel and air from said receiving chamber into the combustion chamber.

35. In an internal combustion engine, a cylinder including a combustion chamber, a piston mounted in said cylinder, means for introducing air into said cylinder, a receiving chamber opening into the combustion chamber, means for feeding a loose mixture of air and pulverized solid fuel to the receiving chamber, a governed valve controlling the admission of the loose mixture to the receiving chamber and means for delivering the charge from the receiving chamber to the combustion chamber when the air in the latter chamber is compressed.

36. In an internal combustion engine, a cylinder including a combustion chamber, a piston mounted in said cylinder, a receiving chamber opening into said combustion chamber, a device for governing the supply of a loose mixture of air and pulverized solid fuel to said receiving chamber, another device controlling the introduction of air into said cylinder, and adjusting means for varying the relative amounts of the two media the supply of which is controlled by said two devices.

37. In an internal combustion engine, a cylinder including a combustion chamber, a piston mounted in said cylinder, a receiving chamber opening into said combustion chamber, a device for governing the supply of a loose mixture of air and pulverized solid fuel to said receiving chamber, another device controlling the introduction of air into said cylinder, and adjusting means for varying the action of the first-named device, so as to alter the amount of air-and-fuel mixture admitted thereby relatively to that of the air supplied by the second-named device.

38. In an internal combustion engine, a cylinder including a combustion chamber, a piston mounted in said cylinder, a receiving chamber opening into said combustion chamber, a valve for governing the supply of a loose mixture of air and pulverized solid fuel to said receiving chamber, a device controlling the introduction of air into said cylinder, and adjusting means associated with said valve to vary the amount of air-and-fuel mixture admitted thereby relatively to that of the air supplied by said device.

39. In an internal combustion engine, a cylinder including a combustion chamber, a piston mounted in said cylinder, a receiving chamber opening into said combustion chamber, a device for governing the supply of a mixture of air and fuel to said receiving chamber, another device controlling the introduction of air into said cylinder, and a retarder interposed between the receiving chamber and the combustion chamber to temporarily hold back a portion of the fuel contained in said mixture while permitting the remainder of said mixture to flow into said combustion chamber.

40. In an internal combustion engine, a cylinder including a combustion chamber, a piston mounted in said cylinder, a receiving chamber opening into said combustion chamber, a device for governing the supply of a mixture of air and fuel to said receiving chamber, another device controlling the introduction of air into said cylinder, and a retarder interposed between the receiving chamber and the combustion chamber to temporarily hold back a portion of the fuel contained in said mixture while permitting the remainder of said mixture to flow into said combustion chamber, and a device for applying an increased pressure to the portion of the mixture thus held back and thereby ejecting it into said combustion chamber.

41. In an internal combustion engine, a cylinder including a combustion chamber, a piston mounted in said cylinder, a receiving chamber opening into said combustion chamber, a valve for governing the supply of a loose mixture of air and pulverized solid fuel to said receiving chamber, said valve having a relatively sharp edge for engagement with its seat adapted to insure tight closure of the valve, a device controlling the introduction of air into the cylinder, and adjusting means associated with said valve to vary the amount of air-and-fuel mixture admitted thereby relatively to that of the air supplied by said device.

42. In an internal combustion engine, a cylinder including a combustion chamber, a piston mounted in said cylinder, a receiving chamber opening into said combustion chamber, a device for governing the supply of a mixture of air and fuel to said receiving chamber, another device controlling the introduction of air into said cylinder, and a retarder interposed between the receiving chamber and the combustion chamber to temporarily hold back a portion of the fuel contained in said receiving chamber while permitting the remainder of said mixture to flow into said combustion chamber, and a device for applying an increased pressure to the portion of the mixture thus held back, said device including an air compressor for producing a highly compressed air, and a controlled air admission valve associated with the receiving chamber for the introduction of the air from the compressor into said chamber whereby to convey or transfer the air-and-fuel mixture into the cylinder.

43. In an internal combustion engine, a cylinder including a combustion chamber, a piston mounted in said cylinder, a receiving chamber opening into said combustion chamber, a device for governing the supply of a loose mixture of air and pulverized solid fuel to said receiving chamber when there is a low pressure in the cylinder, another device controlling the introduction of air into said cylinder, and adjusting means for varying the relative amounts of the two media the supply of which is controlled by said two devices.

In testimony whereof I hereunto affix my signature.

RUDOLF PAWLIKOWSKI.